(12) United States Patent
Grossner et al.

(10) Patent No.: US 7,912,975 B2
(45) Date of Patent: Mar. 22, 2011

(54) SYSTEM AND METHOD FOR APPLICATION LAYER RESOURCE TRAFFIC CONTROL

(75) Inventors: Clifford Grossner, Ottawa (CA); Laura Serghi, Ottawa (CA); Lyle Strub, Ottawa (CA)

(73) Assignee: Alcatel Lucent, Paris (FR)

( * ) Notice: Subject to any disclaimer, the term of this patent is extended or adjusted under 35 U.S.C. 154(b) by 316 days.

(21) Appl. No.: 12/041,157

(22) Filed: Mar. 3, 2008

(65) Prior Publication Data
US 2009/0222573 A1 Sep. 3, 2009

(51) Int. Cl.
*G06F 15/16* (2006.01)
(52) U.S. Cl. .................................. 709/232; 709/230
(58) Field of Classification Search ............ 709/232
See application file for complete search history.

(56) References Cited

U.S. PATENT DOCUMENTS
2007/0233580 A1 10/2007 Pike et al.

FOREIGN PATENT DOCUMENTS
EP 1 462 941 A2 9/2004
EP 1 667 017 A1 6/2006

OTHER PUBLICATIONS

International Search Report, PCT/IB2009/052729, Apr. 2007.
International Search Report, PCT/IB2009/052729, Apr. 2005.
Michele Leroux Bustamante, Learning WCF, Chapter 6, XP008114555.
IBM/Microsoft, Reliable Message Delivery in a Web Services World: A Proposed Architecture Roadmap, Mar. 13, 2003, Version 1.0, XP-002374382.

*Primary Examiner* — Jeffrey Pwu
*Assistant Examiner* — Shripal K Khajuria
(74) *Attorney, Agent, or Firm* — Fay Sharpe LLP

(57) ABSTRACT

Methods and systems are presented for controlling application layer message traffic at a central web services resource in which a web services gateway associated with the central resource sends a backoff message to a gateway associated with a remote web service client, which in turn slows the application layer message traffic to the central resource.

18 Claims, 3 Drawing Sheets

SYSTEM AND METHOD FOR APPLICATION LAYER RESOURCE TRAFFIC CONTROL

FIELD OF THE INVENTION

This invention relates generally to the field of networked communications, and more particularly to methods and systems for controlling application layer message traffic to a resource.

BACKGROUND OF THE INVENTION

Computer networks are becoming increasingly important in providing web based services by a central resource to remote client applications. In one example, an industrial enterprise, a collection of business partners, or government agencies may seek to create a cost effective (scalable) and reliable central store for information records where the information records are entered or modified at many distributed sites and then dynamically aggregated into the central data store resource using web services. In this situation, however, expected service usage patterns can have a huge effect on system design at both the network level and the service levels, particularly where the distributed sites can be expected to all access the central data store resource over a short period of time. For these cases, the peak load on the system may be enormous for a limited amount of time, with very little usage on average. An example of this type of system is educational districts reporting to a provincial or regional authority where events, such as September enrollment, generate a tremendous amount of student record processing in a short period of time. One design challenge for implementing such systems is the lack of sufficient service level monitoring and control points to effectively deal with peak loads on critical web services. Even when peak loads can be predicted with reasonable accuracy, scaling application deployments to meet peak loads can be prohibitively expensive, particularly for networks that must respond to other temporal load increases. It is not economical in these cases to deploy sufficient processing power at the information store to support service peak loads from each end point, particularly when much of the time the majority of the processing capacity is unused. When there are many data entry points that can generate information update requests, the peak load generated on the information store can be considerable. Imposing strict usage limitations on client systems is also often impractical and problematic, and may be unacceptable for blocked web services client applications that need timely service from the central resource. The ability to process data locally at the end points would be negatively impacted, and any network outage would effectively halt system usage. Thus, there is a need for techniques and systems by which web services can be reliably and economically provided by a central web services resource to remote web service clients that require high usage levels for short periods of time without significantly oversizing the resource capacity and without imposing stringent blocking conditions on client systems.

SUMMARY OF THE INVENTION

The following is a summary of one or more aspects of the invention to facilitate a basic understanding thereof, wherein this summary is not an extensive overview of the invention, and is intended neither to identify certain elements of the invention, nor to delineate the scope of the invention. Rather, the primary purpose of the summary is to present some concepts of the invention in a simplified form prior to the more detailed description that is presented hereinafter. The various aspects of the present disclosure relate to systems and methods for controlled traffic shaping and reliable application layer messaging techniques that may be advantageously employed to smooth the load experienced by a central web services resource, thereby reducing the peak processing requirement on the resource while avoiding the adverse effects of end point blocking alternatives to provide a reliable and scalable information store or other central resource to be used by remote clients. Accordingly, an aggregated information store or other central web services resource can be engineered and sized so as to accommodate information update requests and other resource request messaging that result from traffic shaping to produce a "smoothened" processing requirement, generating significant cost savings without blocking end systems. The described systems employ intermediate web services gateway (WSG) nodes near the point of data entry to perform application layer message traffic shaping to prevent loss of data and application blocking at the distributed sites, and may be implemented in any suitable network node or element, such as a web services gateway configured to allow enterprises and agencies to deploy managed services in extranet environments for secure service interoperability between external corporations and autonomous entities. The WSG in certain implementations is positioned in a corporation's DMZ to process web service messages in real time in order to facilitate integration with web services at various participating end points. The WSG in this respect can be deployed to support an aggregated information store or other central web services resource where many points of data entry must be aggregated into a single information store and the peak load that is generated by the data entry points is significantly large when compared with the average load requirements on the information store.

In accordance with one or more aspects of the present disclosure, a system is provided for controlling message traffic at a web service resource, including first and second web services gateways operably coupled with a network, where the first WSG is operatively coupled with a web services client application and the second WSG is operatively coupled with a central web services resource, such as a data store in one example. The first WSG operates to transfer application layer messages, such as XML requests and responses between the client application and a web service resource via the network, and includes a message queue, a messaging manager, and a backoff broker component. The first message queue stores outgoing application layer messages from the client application for the resource, and the messaging manager operates to send the outgoing messages from the queue to the web service resource via the network and to remove the messages from the queue once their delivery has been acknowledged. The first backoff broker component is operative to selectively slow transmission of outgoing application layer messages to the web service resource according to a backoff message received from the network.

The second WSG is operative to transfer application layer messages between the client application and the web service resource via the network, and includes a second message queue for storing incoming application layer messages from the client application for the resource, and a second messaging manager that stores the incoming application layer messages from the network to the second message queue and to acknowledge receipt of the incoming application layer messages to the first messaging manager. The second WSG further includes a second backoff broker component that selectively sends a backoff message to the first backoff broker component based at least partially on a rate of incoming application layer messages received at the second WSG from the network.

In accordance with other aspects of the disclosure, the second backoff broker component selectively sends the backoff message including a backoff period duration determined according to the rate of incoming application layer messages received at the second WSG, and the first backoff broker component selectively stops transmission of outgoing application layer messages to the web service resource according to the backoff period duration.

In accordance with further aspects of the disclosure, the first backoff broker component implements a backoff algorithm to selectively slow the transmission of outgoing application layer messages to the web service resource when a backoff message is received from the second backoff broker component.

In accordance with still further aspects of the disclosure, the first backoff broker component implements the backoff algorithm based at least partially on at least one run time parameter. In certain implementations of these aspects, the first messaging manager determines a waiting time for an application layer response to be received from the second WSG, and the first backoff broker component implements the backoff algorithm based at least partially on the waiting time.

In accordance with other aspects of the disclosure, the first backoff broker component implements the backoff algorithm based at least partially on at least one configurable backoff parameter.

Still other aspects of the disclosure provide a WSG for transferring application layer messages between a network and a client application or a web service resource. The WSG comprises a message queue for storing outgoing application layer messages from the client application or the web service resource, a messaging manager operative to send the outgoing application layer messages from the message queue to the network and to remove the outgoing application layer messages from the message queue once their delivery has been acknowledged, and a backoff broker component operatively coupled with the messaging manager to selectively slow the transmission of outgoing application layer messages according to a backoff message received from the network.

In accordance with further aspects of the disclosure, a the backoff broker component is operative to selectively send a backoff message to another WSG on the network based at least partially on a rate of incoming application layer messages received from the network.

In accordance with still further aspects of the disclosure, the backoff broker component selectively sends the backoff message including a backoff period duration determined according to the rate of incoming application layer messages received at the WSG.

In accordance with other aspects of the disclosure, the backoff broker component selectively stops transmission of outgoing application layer messages according to a backoff period duration in the backoff message received from the network.

In accordance with further aspects of the disclosure, the backoff broker component implements a backoff algorithm to selectively slow the transmission of outgoing application layer messages when a backoff message is received. In addition, the backoff broker component in certain embodiments may implement the backoff algorithm based at least partially on one or more run time parameters or configurable backoff parameters. In other implementations, the messaging manager determines a waiting time for an application layer response to be received from the other WSG on the network and the backoff broker component implements the backoff algorithm based at least partially on the waiting time.

In accordance with still other aspects of the disclosure, a method is provided for controlling application layer message traffic at a central web services resource. The method includes selectively sending a backoff message from a WSG associated with the web services resource to another WSG associated with a web services client application based at least partially on a rate of incoming application layer messages received at the WSG associated with the resource, and selectively slowing the transmission of outgoing application layer messages from the other WSG to the web service resource according to the backoff message received from the WSG.

In accordance with further aspects of the disclosure, the backoff message includes a backoff period duration determined according to the rate of incoming application layer messages received at the WSG, and the selective slowing of the outgoing message transmission includes selectively stopping transmission of outgoing application layer messages according to the backoff period duration in the backoff message.

In accordance with still further aspects of the disclosure, selectively slowing the transmission of outgoing application layer messages includes implementing a backoff algorithm when the backoff message is received.

In accordance with further aspects of the disclosure, the method may also include determining a waiting time for an application layer response to be received from the WSG, and wherein the backoff algorithm is implemented based at least partially on the waiting time.

BRIEF DESCRIPTION OF THE DRAWINGS

The following description and drawings set forth in detail certain illustrative implementations of the invention, which are indicative of several exemplary ways in which the principles of the invention may be carried out. Various objects, advantages, and novel features of the invention will become apparent from the following detailed description of the invention when considered in conjunction with the drawings, in which.

DETAILED DESCRIPTION

Figure 1:
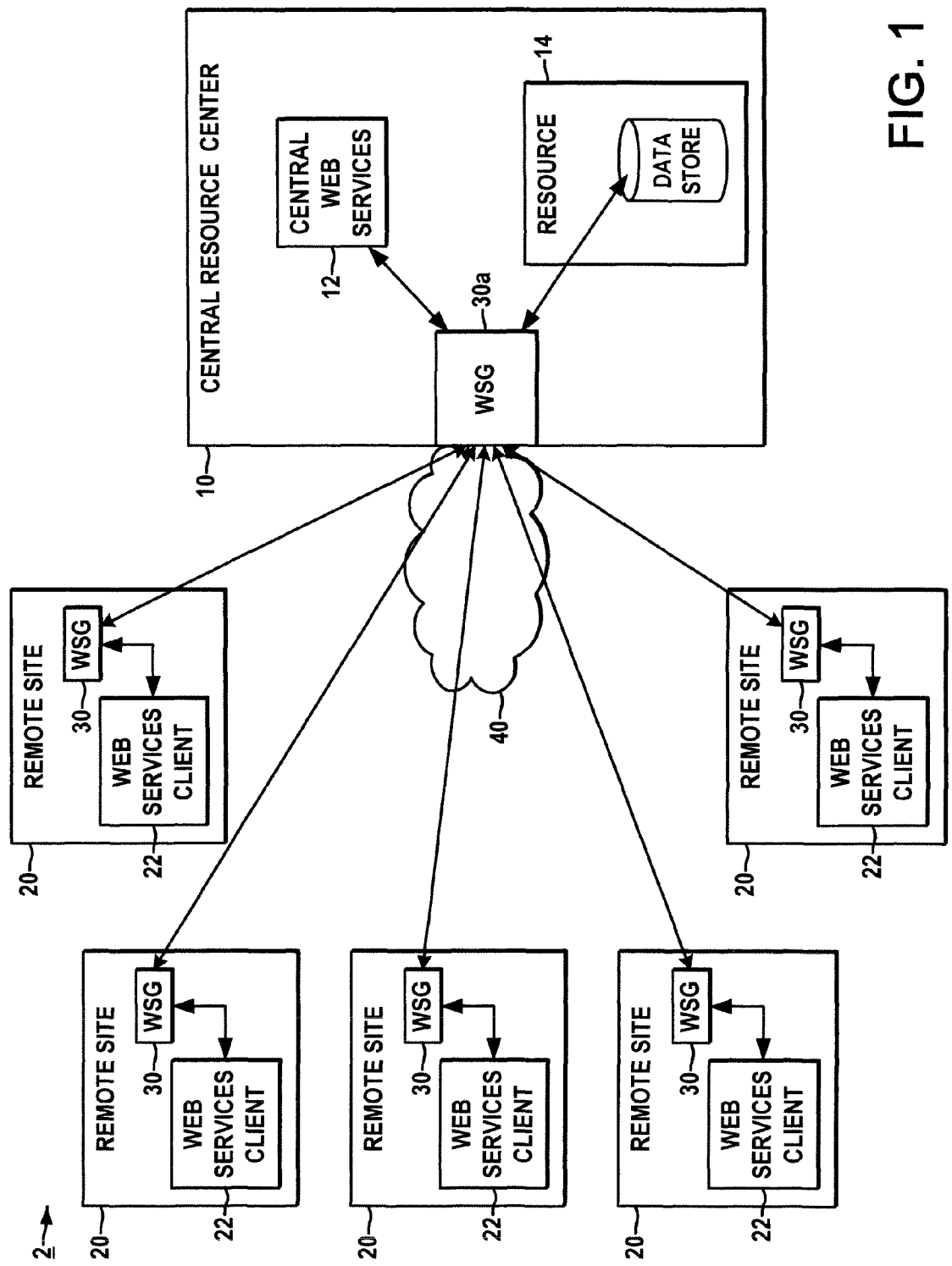
FIG. 1 is a schematic system level diagram illustrating an exemplary communications network having a number of remote web services client applications coupled to a network via web services gateways and a central web services resource coupled to the network by a web services gateway in which the gateways are configured with backoff broker components to control application layer message traffic at the central web services resource in accordance with various aspects of the present disclosure.

Several embodiments or implementations of the various aspects of the present disclosure are hereinafter illustrated and described in conjunction with the drawings, wherein like reference numerals are used to refer to like elements.

Referring initially to FIG. 1, an exemplary networked system 2 is illustrated for controlling application layer message traffic at a central web services resource 14 in accordance with various aspects of the disclosure. The system 2 includes a central resource center 10 having a central services application server 12 and a central web services resource 14, in this case, a data store used for storage and maintenance of records, information, or other data used and updated by various remote web services client applications (clients) 22 at remote sites 20. The remote sites 30 are operatively coupled with the central resource center 10 via a network 40, remote web services gateways (WSGs) 30 located at the remote sites 20, and a central WSG 30a at the central resource center 10. The present disclosure may be implemented in any form, type, and topology of network, whether wired, wireless, or combinations thereof, in which various messages, packets, signals, data, etc., are sent and received according to any suitable messaging protocols, wherein the network may be operated according to any suitable multi-layer scheme (e.g., SOAP stack in one embodiment, the OSI basic reference model or derivatives or variants thereof) in which application layer messages such as XML request and response messages to, from, or between the various networked components including between the clients 22 and the central resources 12, 14 may be segmented or partitioned into packets at lower layers beneath the application layer, and in which one or more layers may add certain control information around a payload portion from another layer to form encapsulated packets or messages.

Figure 2:
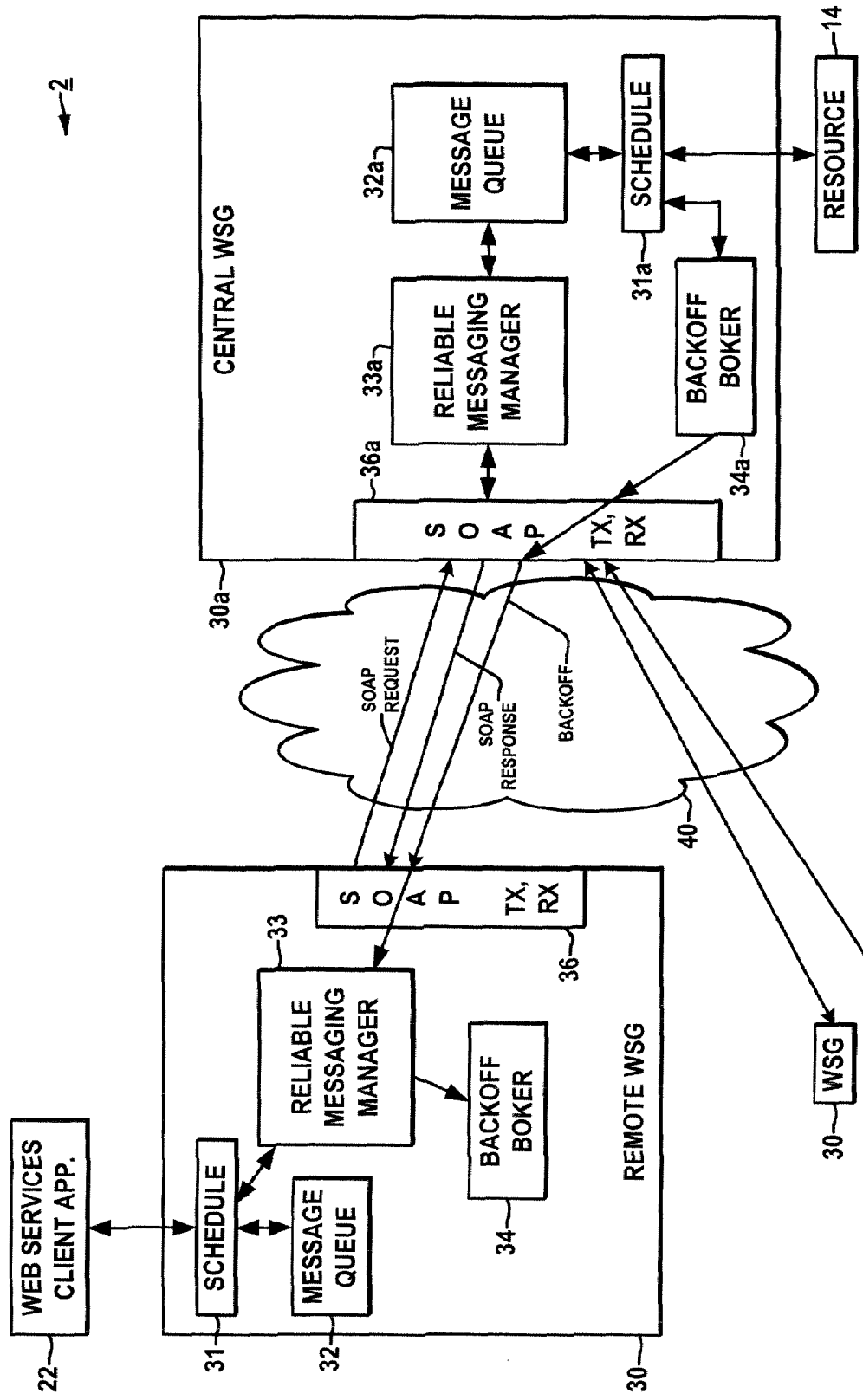
FIG. 2 is a schematic diagram illustrating further details of two exemplary web services gateways in the system of FIG. 1.

Referring also to FIG. 2, the WSGs 30, 30a perform various traffic control functions at the application layer (with respect to transfer of application layer messages) in accordance with the present disclosure regardless of the techniques employed at lower layers. In this regard, each of the WSGs 30, 30a include various components, such as scheduling components 31, 31a, message queues 32, 32a, messaging manager components 33, 33a, backoff broker components 34, 34a, and receiver transmitter components 36, 36a which may be implemented in any suitable form of hardware, software, firmware, programmable or configurable logic, or combinations thereof, whether unitary or distributed among two or more entities, wherein all such implementations are contemplated as falling within the scope of the present disclosure and the appended claims. Various aspects of the disclosure are illustrated and described in terms of software, or algorithms, and/or symbolic representations of operations on data bits within a computer memory, by which ordinary skilled artisans convey the substance of their work. As such, algorithms, scripts, computations, and other operations of the described components may be implemented as computer implemented steps via programmed software core or other programming or configuration to provide a desired result, where such steps involve manipulation or transformation of physical quantities such as stored memory states in a computer memory. In particular, certain embodiments may include software components operating according to programmed computer-executable instructions stored in an electronic memory, which operate on application layer messages sent to or received from the network 40, which data may be likewise stored in an electronic memory at least for a time, wherein the packets and data described herein may be of any suitable form including without limitation optical, electrical, or magnetic signals capable of being stored, transferred, combined, compared, and otherwise manipulated, and wherein these may be referred to in various terms such as bits, values, elements, symbols, characters, terms, numbers, etc.

In this regard, unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices. In addition, the various software implemented aspects of the present disclosure are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The present disclosure is not limited by these aspects of any given implementation.

Figure 3:
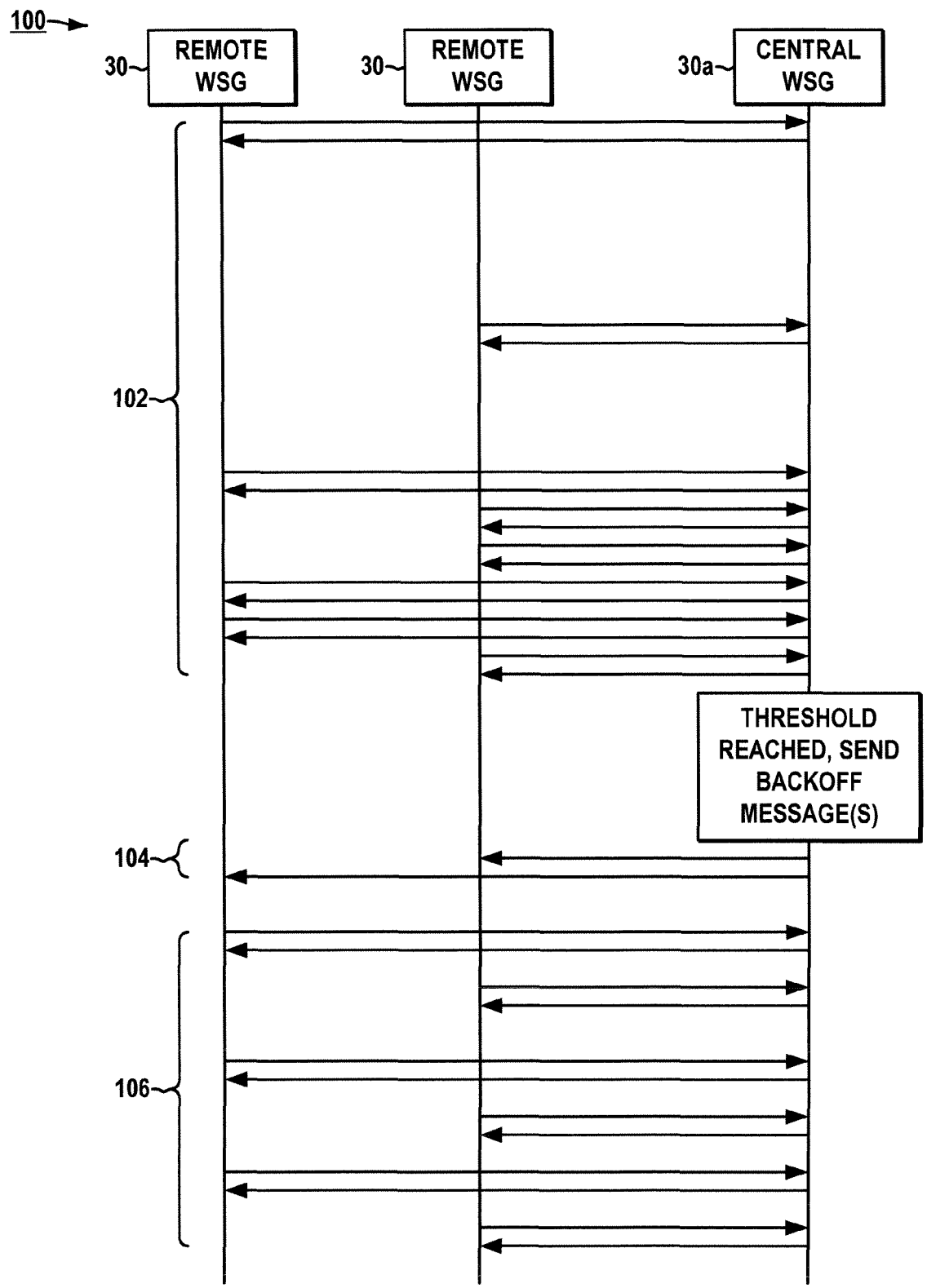
FIG. 3 is a signal flow diagram illustrating various application layer messages between the central and remote web services gateways in the system of FIGS. 1 and 2 in accordance with the present disclosure.

In operation, the system 2 advantageously provides for control of application layer message traffic at the web service resource 14 by execution of backoff processing by the WSGs 30, 30a. As best shown in FIGS. 2 and 3, the remote WSG 30 is operatively coupled with the network 40 and an associated web services client application 22 to transfer application layer messages 102, 106 between the client 22 and the central resource data store 14 via the network 40. This first web services gateway 30 includes a first message queue 32 that stores outgoing application layer messages from the client application 22 for the resource 14. The WSG 30 also includes a first messaging manager 33 that sends the outgoing application layer messages from the queue 32 to the web service resource 14 via the SOAP transmit/receive component 36 and the network 40. In addition, the messaging manager 33 removes outgoing application layer messages from the queue 32 once their delivery has been acknowledged by the recipient WSG 30a. The gateway 30 also provides a backoff broker component 34 operatively coupled with the first messaging manager 33, which selectively slows transmission of application layer messages to the central resource 14 according to a backoff message received from the network 40, in this case, a backoff message sent by the backoff broker 34a of the central WSG 30a.

The central site 10 includes a second WSG 30a which is operatively coupled with the network 40 and with the central web service resource 14 and which operates to transfer application layer messages 102, 106 (FIG. 3) between the client application 22 and the web service resource 14 via the network 40. The second web services gateway 30a (FIG. 2) includes a second message queue 32a for storing incoming application layer messages from the client application 22 for the resource 14, a second messaging manager 33a that stores incoming messages from the network 40 to the queue 32a and acknowledges receipt of the incoming messages to the first messaging manager 33, and a second backoff broker component 34a. The backoff broker 34a selectively sends a backoff message to the first broker 34 via the network 40 based at least partially on the rate of incoming application layer messages received at the WSG 30a for the resource 14.

The WSGs 30 and 30a can be deployed to support an aggregated information store resource 14 or other form of central web services resource in which many points of data entry must be aggregated into a single information store and the peak load that is generated by the data entry points is significantly large relative to the average load. The WSGs 30 and 30a cooperatively provide policy controlled traffic shaping and reliable messaging techniques with respect to application layer (e.g., XML) messages to "smooth" the load experienced by the information store 14, thereby yielding a large reduction in the peak processing requirement of the central resource 14. As a result, the WSGs 30, 30a provide an economical and reliable solution for a central shared resource such as the data store 14. In the illustrated embodiment, the application layer messages are XML messages, although the methods and systems of the present disclosure can be employed in conjunction with controlling message traffic for any type or form of application layer messages, including without limitation HL7, Modbus, CDP, NNTP, SIP, SSI, DNS, FTP, Gopher, HTTP, NFS, NTP, DHCP, SMPP, SMTP, SNMP, Telnet, ISUP, INAP, MAP, TUP, TCAP, AFP, ZIP, RTMP, NBP, FTAM, X.400, X.500, DAP, RIP, SAP, APPC, etc. sent in accordance with any suitable protocol, wherein the present disclosure is not limited to the illustrated embodiments.

In one possible implementation, the backoff broker component 34a of the central WSG 30a selectively sends the backoff message to one or more of the remote (e.g., client) broker components 34 that includes a backoff period duration determined according to the rate of incoming application layer messages received at the second web services gateway 30a. The first backoff broker component 34 at the remote site selectively stops transmission of outgoing application layer messages to the web service resource 14 according to the backoff period duration. In another implementation, the first backoff broker component 34 implements a backoff algorithm to selectively slow the transmission of outgoing application layer messages to the web service resource 14 when a backoff message is received from the second backoff broker component 34a. Such a backoff algorithm can be based in one embodiment at least partially on one or more run time parameters or configurable backoff parameters. In another possible implementation, the first messaging manager 33 determines a waiting time for an application layer response to be received from the second web services gateway 30a, with the first backoff broker component 34 implementing the backoff algorithm based at least partially on the waiting time.

In a preferred implementation, the central and remote WSGs 30a and 30 are functionally identical, and can each operate to send and receive backoff messages and implement local backoff strategies with respect to outgoing application layer messages for smoothing or regulating the network layer message traffic of a central resource. Thus, further aspects of the disclosure provide a web services gateway 30, 30a per se for transferring application layer messages 102, 106 between the network 40 and a client application 22 or a web service resource 14, where the gateway includes a message queue (32, 32a) for storing outgoing application layer messages from the client application 22 or the web service resource 14, and a messaging manager 33 which operates to send the outgoing application layer messages from the queue 32 to the network 40 as well as to remove the messages once delivery thereof has been acknowledged. In accordance with this aspect of the disclosure, moreover, a backoff broker component 34 is provided in the WSGs 30, 30a that operates to selectively slow the transmission of outgoing application layer messages according to a backoff message received from the network 40. In addition, the backoff broker 34 may send a backoff message to another WSG on the network 40 based at least partially on a rate of incoming application layer messages received from the network 40, which backoff message may in certain embodiments include a backoff period duration determined according to the rate of incoming application layer messages received at the web services gateway 30. The backoff component 34, moreover, may selectively stop outgoing application layer message transmission according to a backoff period duration if provided in the backoff message received from the network 40, and/or may implement a back-off algorithm to selectively slow the transmission of outgoing application layer messages when a backoff message is received. The backoff algorithm implementation can be based at least partially on at least one run time parameter or configurable backoff parameter, and other embodiments include the messaging manager 33 determining a waiting time for an application layer response to be received from the other WSGs and implementing the backoff algorithm based at least partially on the waiting time.

The exemplary WSGs 30, 30a and the above described systems thus provide a scalable and reliable web service message delivery solution that may be easily implemented on gateway technology components typically deployed in a run time application layer message path. The solution, moreover, provides a queuing mechanism for queuing messages from distributed or remote end point clients which detects the cumulative load on a central service resource 14, where the algorithm(s) or backoff implementation can be of a variety of forms with configurable prioritization, such as a policy-driven "fairness" algorithm (e.g., round robin, weighted fair queuing, etc.) in order to ensure that messages are not dropped at any end points. This disclosed system also provides a backoff control mechanism in the broker components 34, 34a for communicating from the "central queue" to the distributed end points to slow message delivery in order to avoid queue overloads by effectively smoothing the application layer service traffic presented at the information store 14. Additionally, this solution provides the remote broker components to restrict web service message delivery by the remote WSGs based on one or more criteria, including without the backoff message(s) sent by the central WSG 30a, or the remote WSGs 30 may initiate a backoff algorithm based on a detected network problem, such as a missed acknowledgement from the destination. For these situations the WSG 30 may be adapted to maintain a message queue and schedule WS message delivery based on a provisioned policy. In operation, the remote WSGs 30 essentially proxy the application layer (e.g., XML) web service messages to the central service resource 14 and provide a reliable messaging layer to guarantee message delivery. This enables the end point information systems to "fire-and-forget" web service messages at the application layer thereby eliminating end-point blocking conditions. As these web service request messages are effectively queued up at the remote WSGs 30, the subsequent application layer adaptive congestion control can then be employed to selectively adjust or adapt the transmission rate to the central resource's ability to handle the communication load without further intervention or servicing by the clients 22. In this fashion, a quick peak or spike in resource requests will be spread out over a longer time to limit the resource message traffic (at the application layer) to a manageable level.

The message queue 32 at each distributed WSG 30 thus maintains the application layer web service request messages until their delivery has been acknowledged by the "next hop" destination, where the queuing components may also support multiple classes of service, such as those based on usage of the central resource 14, with the possibility of different backoff messages and algorithms for each class. The scheduler components 31, 31a operate to control when incoming web service messages are forwarded to their destination from the queue 32, 32a (e.g., the client applications 22 are destinations for incoming messages to the WSGs 30 and the central resource 14 is a destination for messages to the central WSG 30a). The scheduler 31, in this regard, may separately implement scheduling algorithms, such as round robin or weighted fair queuing, etc., and may support an independent scheduling algorithm for each class of service at the message queue 32, 32a for incoming messages at the application layer.

As best shown in FIGS. 2 and 3, the remote clients 22 provide XML request messages that are sent via the associated remote WSGs 30 through the network 40 to the central WSG 30a to request web services from the central resource 14. The resource 14, in turn, sends XML response messages through the WSG 30a back to the distributed WSGs 30 and the clients 22. As shown in FIG. 3, this process continues with such application layer request and response messages 102 until a threshold amount of incoming message traffic is seen at the central WSG 30a. At this point, the backoff broker component 34a of the central WSG 30a sends one or more backoff messages to one or more of the remote WSGs 30, and the local backoff brokers 34 implement a selective slowing of the outgoing application layer message traffic to the central resource 14, whereby the overall message traffic 106 following the backoff message will be spread out in time to smooth the resource loading to a manageable level.

Further aspects of the present disclosure provide a method of controlling application layer message traffic at a central web services resource 14. The method includes selectively sending a backoff message from a web services gateway 30a associated with a central web services resource 14 to another web services gateway 30 associated with a web services client application 22 based at least partially on a rate of incoming application layer messages received at the web services gateway 30a. The method further includes selectively slowing the transmission of outgoing application layer messages from the other web services gateway 30 to the web service resource 14 according to the backoff message received from the web services gateway 30a. In certain embodiments, the backoff message may include a backoff period duration determined according to the rate of incoming application layer messages received at the web services gateway 30, and the selective slowing of the outgoing application layer message transmission includes selectively stopping transmission according to the backoff period duration in the backoff message. The selective traffic slowing may include implementing a backoff algorithm when the backoff message is received, and the method may also include determining a waiting time for an application layer response to be received from the web services gateway, and implementing the backoff algorithm based at least partially on the waiting time.

Although the invention has been illustrated and described with respect to one or more exemplary implementations or embodiments, equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A system for controlling message traffic at a web service resource, comprising:
   a first web services gateway operatively coupled with a network and a web services client application to transfer application layer messages between the client application and a web service resource via the network, the first web services gateway comprising:
      a first message queue for storing outgoing application layer messages from the client application for the resource,
      a first messaging manager operative to send the outgoing application layer messages from the first message queue to the web service resource via the network and to remove the outgoing application layer messages from the first message queue once their delivery has been acknowledged, and
      a first backoff broker component operatively coupled with the first messaging manager to selectively slow the transmission of outgoing application layer messages to the web service resource according to a backoff message received from the network; and
   a second web services gateway operatively coupled with the network and the web service resource to transfer application layer messages between the client application and the web service resource via the network, the second web services gateway comprising:
      a second message queue for storing incoming application layer messages from the client application for the resource,
      a second messaging manager operative to store the incoming application layer messages from the network to the second message queue and to acknowledge receipt of the incoming application layer messages to the first messaging manager, and
      a second backoff broker component operatively coupled with the second messaging manager to selectively send a backoff message including a backoff period duration determined according to the rate of incoming application layer messages received at the second web services gateway to the first backoff broker component via the network based at least partially on a rate of incoming application layer messages received at the second web services gateway from the network.

2. The system of claim 1, wherein the application layer messages are XML messages.

3. The system of claim 1, wherein the first backoff broker component selectively stops transmission of outgoing application layer messages to the web service resource according to the backoff period duration.

4. The system of claim 1, wherein the first backoff broker component implements a backoff algorithm to selectively slow the transmission of outgoing application layer messages to the web service resource when a backoff message is received from the second backoff broker component.

5. The system of claim 4, wherein the first backoff broker component implements the backoff algorithm based at least partially on at least one run time parameter.

6. The system of claim 5, wherein the first messaging manager determines a waiting time for an application layer response to be received from the second web services gateway, and wherein the first backoff broker component implements the backoff algorithm based at least partially on the waiting time.

7. The system of claim 4, wherein the first backoff broker component implements the backoff algorithm based at least partially on at least one configurable backoff parameter.

8. The system of claim 1, wherein the web service resource is a data store.

9. A web services gateway for transferring application layer messages between a network and a client application or a web service resource, comprising:
- a message queue for storing outgoing application layer messages from the client application or the web service resource;
- a messaging manager operative to send the outgoing application layer messages from the message queue to the network and to remove the outgoing application layer messages from the message queue once their delivery has been acknowledged; and
- a backoff broker component comprising a processor operatively coupled with the messaging manager and programmed to selectively slow the transmission of outgoing application layer messages according to a backoff message received from the network
- wherein the backoff broker component is operative to selectively send a backoff message to another web services gateway on the network based at least partially on a rate of incoming application layer messages received from the network; and
- wherein the backoff broker component selectively sends the backoff message including a backoff period duration determined according to the rate of incoming application layer messages received at the web services gateway.

10. The web services gateway of claim 9, wherein the backoff broker component selectively stops transmission of outgoing application layer messages according to a backoff period duration in the backoff message received from the network.

11. The web services gateway of claim 9, wherein the backoff broker component implements a backoff algorithm to selectively slow the transmission of outgoing application layer messages when a backoff message is received.

12. The web services gateway of claim 11, wherein the backoff broker component implements the backoff algorithm based at least partially on at least one run time parameter.

13. The web services gateway of claim 12, wherein the messaging manager determines a waiting time for an application layer response to be received from the other web services gateway on the network, and wherein the backoff broker component implements the backoff algorithm based at least partially on the waiting time.

14. The web services gateway of claim 11, wherein the backoff broker component implements the backoff algorithm based at least partially on at least one configurable backoff parameter.

15. A method of controlling application layer message traffic at a central web services resource, the method comprising:
- selectively sending a backoff message including a backoff period duration determined according to the rate of incoming application layer messages received at the web services gateway from a web services gateway associated with the web services resource to another web services gateway associated with a web services client application based at least partially on a rate of incoming application layer messages received at the web services gateway associated with the resource; and
- selectively slowing the transmission of outgoing application layer messages from the other web services gateway to the web service resource according to the backoff message received from the web services gateway.

16. The method of claim 15, wherein selectively slowing the transmission of outgoing application layer messages comprises selectively stopping transmission of outgoing application layer messages according to the backoff period duration in the backoff message.

17. The method of claim 15, wherein selectively slowing the transmission of outgoing application layer messages comprises implementing a backoff algorithm when the backoff message is received.

18. The method of claim 15, further comprising determining a waiting time for an application layer response to be received from the web services gateway, and wherein the backoff algorithm is implemented based at least partially on the waiting time.

* * * * *